United States Patent [19]
Staib et al.

[11] Patent Number: 5,779,221
[45] Date of Patent: Jul. 14, 1998

[54] ELECTROHYDRAULIC PRESSURE ADJUSTING DEVICE FOR A SLIP-CONTROLLED VEHICLE BRAKE SYSTEM

[75] Inventors: Helmut Staib, Schwieberdingen; Gunther Glock, Steinheim; Michael Friedow, Tamm; Jurgen Lander, Stuttgart; Ulrich Pechtold, Tamm, all of Germany

[73] Assignee: Robert Bosch GmbH, Stuttgart, Germany

[21] Appl. No.: 727,383

[22] PCT Filed: Mar. 27, 1995

[86] PCT No.: PCT/DE95/00412

§ 371 Date: Oct. 15, 1996

§ 102(e) Date: Oct. 15, 1996

[87] PCT Pub. No.: WO95/28304

PCT Pub. Date: Oct. 26, 1995

[30] Foreign Application Priority Data

Apr. 13, 1994 [DE] Germany .................. 44 12 665.4

[51] Int. Cl.$^6$ ........................................... F16K 31/02
[52] U.S. Cl. ........................ 251/129.15; 303/119.2
[58] Field of Search ............. 251/129.15, 129.01; 303/119.2

[56] References Cited

U.S. PATENT DOCUMENTS 5,364,067  11/1994  Linkner, Jr. .............. 251/129.15 X
5,462,344  10/1995  Jakob et al. .............. 303/119.2

FOREIGN PATENT DOCUMENTS 4100967  7/1992  Germany .
4141546  6/1993  Germany .
686658  1/1953  United Kingdom .

*Primary Examiner*—Kevin Lee
*Attorney, Agent, or Firm*—Edwin E. Greigg; Ronald E. Greigg

[57] ABSTRACT

A pressure adjusting device that has at least one electromagnetically actuatable valve, which is united with a valve block and has both a valve dome that protrudes from the valve block and a coil that is alignable with and mountable on the valve dome. The coil is resiliently joined, by means of electrical contact elements to a cap that covers the coil and the valve dome and is fastened to the valve block. The mounted coil is also axially braced, remote from the valve block, on the cap with a spring element in the form of a sheet-metal spring, one side of the spring element engages the valve block and another side engages the coil. Jarring and impact strains on the electrical contact elements are thereby avoided. The electrohydraulic pressure adjusting device is usable for slip-controlled vehicle brake systems.

4 Claims, 1 Drawing Sheet

ELECTROHYDRAULIC PRESSURE ADJUSTING DEVICE FOR A SLIP-CONTROLLED VEHICLE BRAKE SYSTEM

PRIOR ART

The invention is based on an electrohydraulic pressure adjusting device as defined hereinafter.

From German Patent Disclosure DE 41 00 967 A1, such an electrohydraulic pressure adjusting device is already known, in which the coils of magnet valves are suspended elastically resiliently from a hoodlike cap, so as to be alignable relative to a valve lock when joined to it, or in other words alignable radially and axially. To that end, elastic mounts are provided, in the form of helical compression springs, between the cap and the coils so as to generate a force on the coils oriented counter to the valve block. After the joining, the location of the coils is to be secured by a defined axial contact pressure of the coils against the valve block. As long as the joining operation has not yet been performed, however, the coils are braced in the cap against the stop so as to absorb the force of the springs, so that contact elements that connect the coils to an electronic controller in the cap located above the coils will not be overloaded. The structural expense for absorbing a spring forces in a cap is relatively great.

ADVANTAGES OF THE INVENTION

Another pressure adjusting device according to the invention having the characteristics of the body of the claim has the advantage over the prior art that the spring force does not become effective until the coil is joined to the valve block, or in other words contact elements of the coil are not subjected to any strain from the spring force prior to the joining operation. Moreover, a spring element can be embodied as a sheet-metal spring of only slight structural height. A relatively shallow spring characteristic curve can also be attained, which advantageously limits changes in force over the spring travel.

By the provisions recited herein, advantageous further features of and improvements to the pressure adjusting device disclosed are possible.

One embodiment of the invention has an advantage of inducing the spring force into the coil without a lateral force.

With further feature of the invention, advantages in terms of manufacturing and assembly are attained by the one-piece form of the sheet-metal spring that can be used with a plurality of coils.

Another provision has an advantage that the sheet-metal spring can be mounted beforehand in captive fashion, and when arranged on the cap can also provide transport protection for the coil located in the cap.

BRIEF DESCRIPTION OF THE DRAWINGS

One exemplary embodiment of the invention is shown in simplified form in the drawing and described in further detail in the ensuing description.

DESCRIPTION OF THE EXEMPLARY EMBODIMENT

Figure 1:
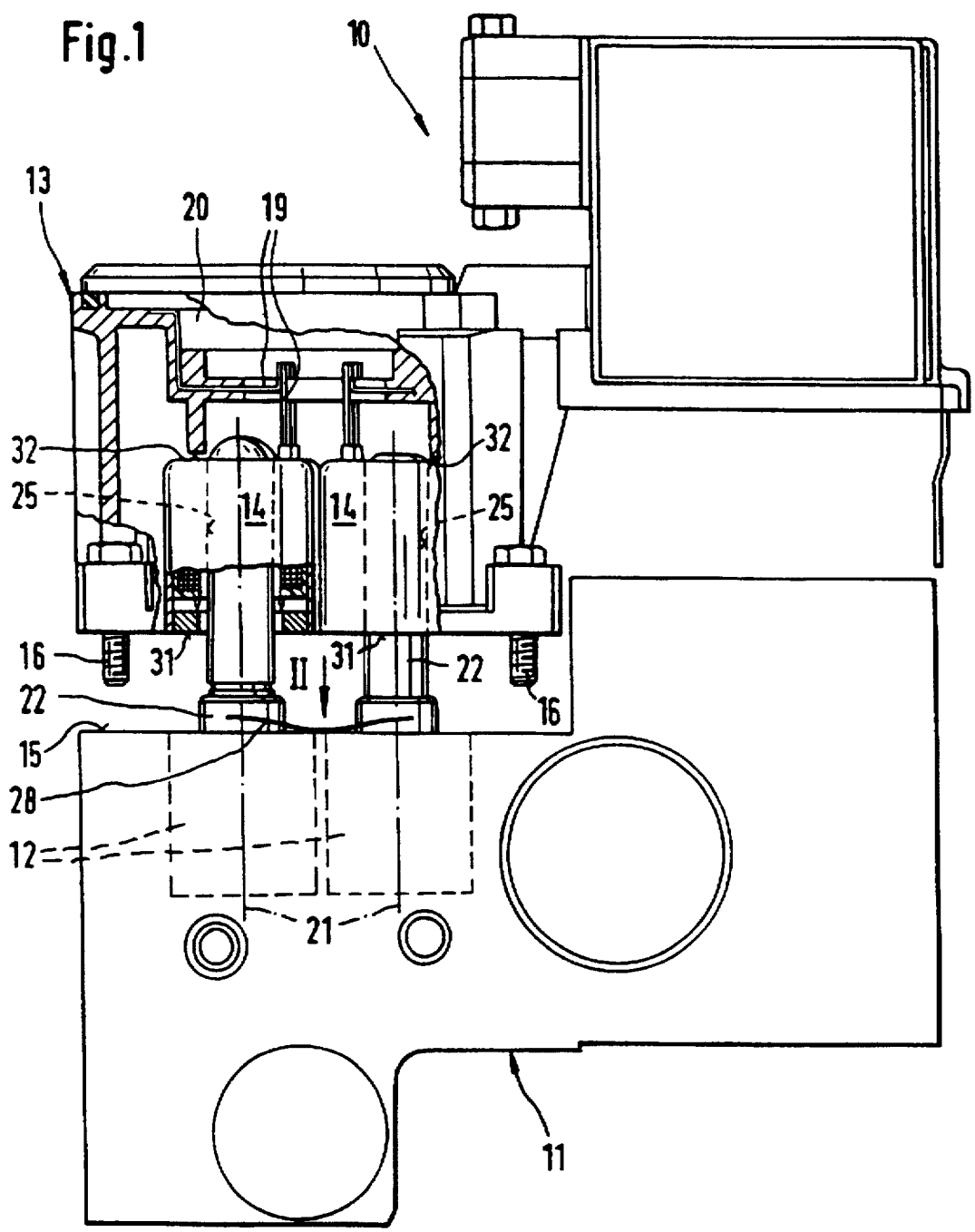
FIG. 1 shows a view of a pressure adjusting device during joining of coils, received in a cap, to a valve block.

An electrohydraulic pressure adjusting device 10 shown in FIG. 1 for a slip-controlled vehicle brake system substantially comprises a valve block 11, in which valves 12 are received, and a hoodlike cap 13 with electrical elements disposed in it, such as coils 14, for the electromagnetic actuation of the valves 12.

FIG. 1 shows a state when the cap 13 is joined to the valve block 11. In the fully assembled state, the cap 13 is united with the valve block 11 along a support face 15 of the valve block and is joined by means of screws 16.

The valves 12 are disposed in the valve block 11 in two rows that extend parallel to one another, perpendicular to the plane of the drawing. The coils 14 are arranged inside the cap 13 in the same way and substantially comprise a winding, a winding carrier, connection wires, and a magnetic flux-conducting jacket. The coils 14 are joined to an electronic controller 20, disposed in the cap 13, by resilient electrical contact elements 19. Because of the resilience of the contact elements 19, the coils 14 can be subjected to changes in their location in the cap 13 in the axial and radial directions relative to their longitudinal axis 21.

Each of the valves 12 has a valve dome 22 protruding at right angles past the support face 15 of the valve block 11. The diameter of the circular-cylindrical valve domes 22 is adapted to fit the inside bore 25 of the coil 14. Since despite precision manufacturing, the valve domes 22 are subject to tolerances in terms of both their location and their axial course, the coils 14 are capable, while the cap 13 is being joined to the valve block 11, on being mounted on the valve dome, of following these deviations because of the resilience of their mounting in the cap 13; that is, the respective aligned coil 14 extends coaxially with the associated valve dome 22.

In a pressure adjusting device 10 mounted in a vehicle, it must be assured that the axial resilience of the coils 14 desired when the cap 13 is mounted on the valve block 11 is cancelled under the conditions that prevail during driving operation. To this end, a spring element in the form of a sheet-metal spring 28 is disposed on the valve block 11.

Figure 2:
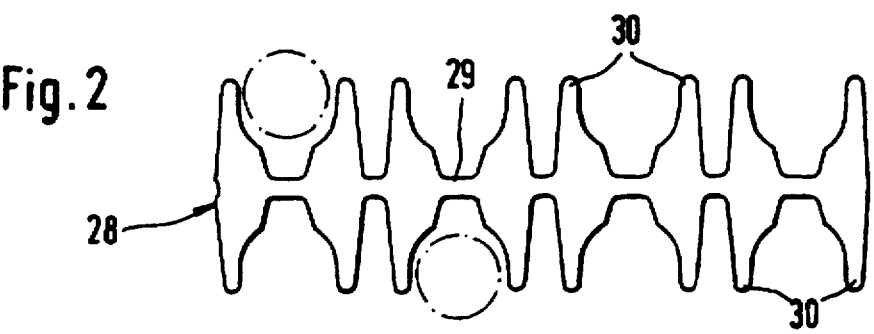
FIG. 2 is a view in the direction of the arrow II of FIG. 1 of a spring element disposed between the coils and the valve block.

The sheet-metal spring 28 shown in plan view in FIG. 2 has a longitudinally continuous rib 29, from which spring tongues 30 extend to both sides at right angles to it. Two adjacent spring tongues 30 are each associated with one coil 14. When the sheet-metal spring 28 is placed on the valve block 11, the rib 29 is braced against the support face 15, while the spring tongues 30 with their free end assume a spacing from the support face. The aforementioned pairs of spring tongues each enclose one valve dome 22 between them, as represented in FIG. 2 by circles drawn in dot-dashed lines. During the operation of mounting the cap 13, which covers the coils 14 and the valve domes 22, on the valve block 11, the coils in the final phase of the joining operation rest with their face end 31 toward the valve block on the spring tongues 30 of the sheet-metal spring 28, these tongues being embodied like leaf springs. The spring tongues 30 engage diametrically opposed zones of the face end 31 of the coil. With increasing prestressing, the spring tongues 30 now cause a limited axial displacement of the coils 14 toward a support face 32 remote from the valve block, which face the cap 13 presents for each coil. In its terminal position relative to the valve block 11 that the cap 13 assumes, the spring tongues 30 of the sheet-metal spring 28 are prestressed to such an extent that the attained spring force no longer allows any change in location of the coils 14 during the jarring and impacting stresses that occur during operation of the pressure adjusting device 10. As a result, an overload or in other words breakage of the electrical contact elements 19 of the coils 14 is prevented. Since the spring tongues 30 of the sheet-metal spring 28 can be embodied with a relatively shallow spring characteristic curve, force deviations in the event of slight differences in the terminal location of the coils 14 in the cap 13 are likewise only slight.

In the exemplary embodiment shown, the sheet-metal spring 28 is placed between the valve block 11 and the cap 13. In a departure from this, the sheet-metal spring 28 may be provided with fastening elements, such as tongues, not shown, that are located in the region of the rib 29 and that for instance engage a bore of the valve block 11 and are locked therein in detent fashion. As a result, the sheet-metal spring 28 is captive and cannot be lost, so that it can already be disposed on the valve block 11 during mounting of the valve block structural group. The fastening elements may, however, also be embodied for arrangement of the sheet-metal spring 28 on the cap 13 or on at least one coil 14. If there is a sufficiently intimate connection with the cap 13, the sheet-metal spring 28 may moreover act as protection during transporting for the coils 14 mounted in the cap 13 until they have been finally assembled on the valve block 11. The foregoing relates to preferred exemplary embodiments of the invention, it being understood that other variants and embodiments thereof are possible within the spirit and scope of the invention, the latter being defined by the appended claims.

What is claimed and desired to be secured by U.S. Letters Patent is:

1. An electrohydraulic pressure adjusting device (10), for a slip-controlled vehicle brake system, having at least one electromagnetically actuatable valve (12), which is united with a valve block (11) and has both a valve dome (22), protruding from the valve block, and a coil (14) that is aligned with and mounted on the valve dome, a cap (13) covers the coil (14) and the valve dome (22) and is fastened to the valve block (11), and a spring element (28) that axially retains the mounted coil (14) is disposed between the coil (14) and the valve block (11), the coil of the valve (12) before the cap is secured in place is suspended elastically resiliently from the cap (13), the spring element is a sheet-metal spring (28), subsequent to securing the cap (13) to the valve block 11, the spring (28) engages the valve block (11) on one side and on the other side engages the coil (14) and that the coil (14) is axially braced on the cap (13) remote from the valve block.

2. The electrohydraulic pressure adjusting device in accordance with claim 1, in which the sheet-metal spring (28) engages diametrically opposed zones of the face end (31) toward the valve block of the coil (14).

3. An electrohydraulic pressure adjusting device in accordance with claim 1, comprising valves (12) disposed in two parallel opposed rows, the sheet-metal spring (28) has a rib (29), braced on the valve block (11) extending between the rows, from which rib spring tongues (30) that extend substantially perpendicular to said valve block extend to the coils (14) of both rows.

4. The electrohydraulic pressure adjusting device in accordance with claim 2, comprising valves (12) disposed in two parallel opposed rows, the sheet-metal spring (28) has a rib (29), braced on the valve block (11) extending between the rows, from which rib spring tongues (30) that extend substantially perpendicular to said valve block extend to the coils (14) of both rows.

* * * * *